United States Patent [19]
Stephenson et al.
[11] Patent Number: 4,923,037
[45] Date of Patent: May 8, 1990

[54] FALL ARREST DEVICE

[76] Inventors: John Stephenson, P.O. Box 163, Hampton, Ontairo L0B 1J0; Ian McGuffie, 911 Vistula Drive, Pickering, Ontario L1W 2L6, both of Canada

[21] Appl. No.: 372,857

[22] Filed: Jun. 29, 1989

[51] Int. Cl.[5] ........ F16D 59/02
[52] U.S. Cl. ........ 188/188; 188/65.1
[58] Field of Search ........ 188/64, 65.1, 65.2, 188/65.4, 65.5, 135, 136, 188, 189

[56] References Cited

U.S. PATENT DOCUMENTS

| | | | |
|---|---|---|---|
| 2,313,437 | 3/1943 | Hedenberg | 188/188 |
| 2,931,466 | 4/1960 | Allenbaugh | 138/188 |
| 3,327,811 | 6/1967 | Mastroberte | 187/38 |
| 3,662,992 | 5/1972 | Vittert | 254/192 |
| 3,830,346 | 8/1974 | Watts | 188/188 |
| 3,980,161 | 9/1976 | Mauldin | 188/188 |
| 4,533,026 | 8/1985 | Bernard | 188/184 |

FOREIGN PATENT DOCUMENTS

| | | | |
|---|---|---|---|
| 2457361 | 1/1981 | France | 188/65.1 |
| 832419 | 4/1960 | United Kingdom | 188/65.1 |

*Primary Examiner*—Duane A. Reger
*Attorney, Agent, or Firm*—Ridout & Maybee

[57] ABSTRACT

A fall arrest device movable along a vertical lifeline comprises a toothed wheel rotatable in its own housing, which housing is pivoted and spring loaded inside an outer housing, so as to cause the toothed wheel to bear upon a lifeline running within a covered channel at the front of the outer housing. The toothed wheel thus pivots with respect to the outer housing and friction between the wheel and the rope causes the wheel to rotate as the device is moved up or down the rope. When the downward velocity of the outer housing reaches a predetermined rate, a centrifugal clutch mechanism stops the rotation of the toothed wheel so that the friction between the rope and the stationary toothed wheel causes the housing of the toothed wheel to pivot within the outer housing, wedging the rope against the outer housing and causing the rope to jam to prevent further movement of the fall arrest device therealong.

7 Claims, 3 Drawing Sheets

FALL ARREST DEVICE

This invention relates to fall arrest devices. More particularly, this invention relates to a fall arrest device (FAD) including a centrifugal activating and locking mechanism, for use in a fall arrest system (FAS) comprising a full-body harness worn by a person working at a height, a vertical lifeline anchored above the worker on which the FAD rides, and means connecting the harness to the FAD, to arrest the worker's fall while minimizing the risk to him of bodily injury.

Many commercially available FADs are designed to grab onto the rope or cable lifeline whenever the device moves downwards therealong. To facilitate the user's descent down the structure being worked on, such devices are normally partially disabled while the worker descends. They may nevertheless seize the lifeline, inconveniencing and annoying the worker by requiring him to climb back up sufficiently to free the device before continuing down. This has led to a number of such devices being considered "user-unfriendly" for certain types of work, e.g., power line maintenance.

The use of various centrifugal braking mechanisms is known in applications such as safety hoisting blocks and in safety brakes for scaffolding. U.S. Pat. No. 4,533,026 (Bernard) describes a FAD which houses a first cable diverter around which a portion of the taut lifeline is diverted, a pulley with a V-shaped peripheral groove in which the cable is wound over a part of the circumference, and a second cable diverter to redirect the cable back to the vertical as it passes out the bottom of the FAD. The pulley carries a pawl system which stops the pulley rotation at a predetermined rotational speed. This causes the rope to be pulled by the weight of the falling body into the V-shaped groove, thus increasing the frictional forces on the rope which brakes the user's fall.

In the Bernard device and those operating on a similar principle, the lifeline is forced to slide around a bend over the pulley inside the housing, imposing a frictional drag on the device, the magnitude of which will depend critically upon the tension in the lifeline. If the tension is too low, there is a risk that the critical free-fall distance will be too great, presenting a risk of user injury. On the other hand, if the cable is sufficiently tensioned to minimize that risk, then there will be a considerable frictional drag on the device in ordinary operation, making it harder for the worker to pull it along with him in normal ascent or descent.

It is an object of the present invention to provide an improved lightweight and compact FAD which will move up and down a lifeline with minimal resistance, but with sufficient friction to remain at rest on the lifeline above the worker when he pauses in his descent.

It is a further object of the invention to provide a FAD which will reduce the free-fall distance to which a user is subjected.

It is a still further object of the invention to provide a fall arrest device which will not lock onto a lifeline when the user is ascending or descending the structure being worked on.

With a view to overcoming the aforementioned disadvantages of known FADs and achieving the aforementioned objects, there is provided a fall arrest device which includes a toothed wheel in its own housing which is pivoted and spring loaded inside an outer housing so as to cause the toothed wheel to bear upon the lifeline, which is itself constrained to pass through the outer housing. The outer housing serves as a pivot point for the toothed wheel. The friction between the toothed wheel and the rope causes the toothed wheel to rotate as the outer housing is moved up or down the rope. When the downward velocity of the outer housing reaches five or six feet per second, a centrifugal pawl, driven by the toothed wheel, is caused to open and catch in a notch in the wall of the inner housing. This stops the rotation of the toothed wheel. The friction between the rope and the now stationary toothed wheel causes the toothed wheel, in its housing, to pivot in a manner which wedges the rope against the outer housing, causing the rope to jam and preventing further movement of the FAD therealong.

Other objects and advantages of this invention will be apparent from the detailed description which follows taken in conjunction with the accompanying drawings, in which.

Figure 2:
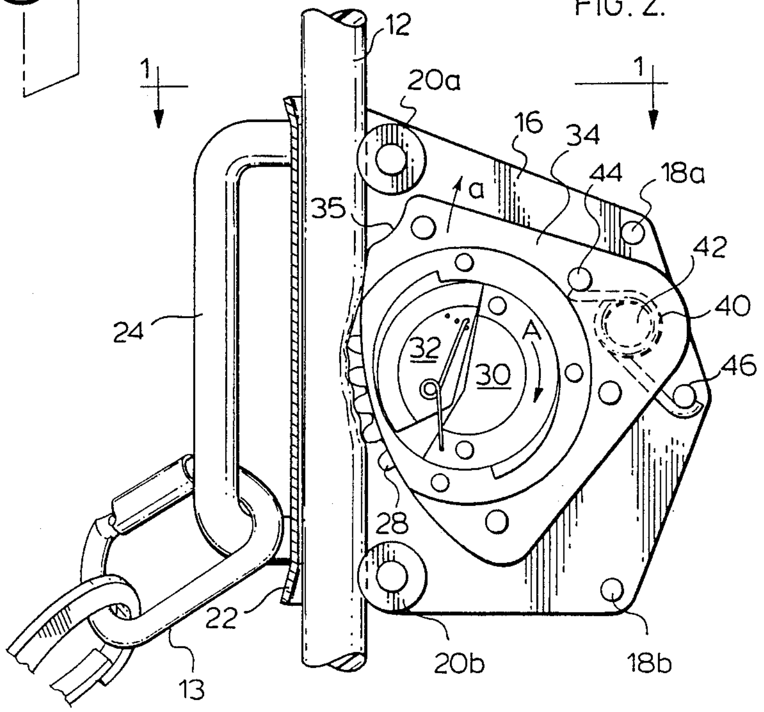
FIG. 2 is a side elevational view of the fall arrest device of FIG. 1 shown with the receiving gate closed and engaging a lifeline, facing cover plates of the housing and a portion of the gate being omitted to reveal the centrifugal locking mechanisms.
Figure 3A:
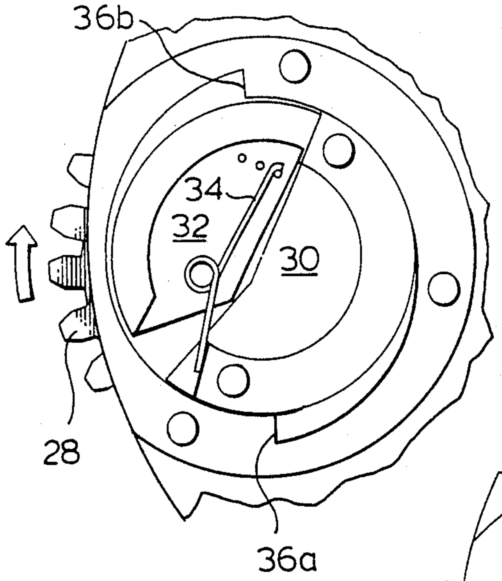
Figure 3B:
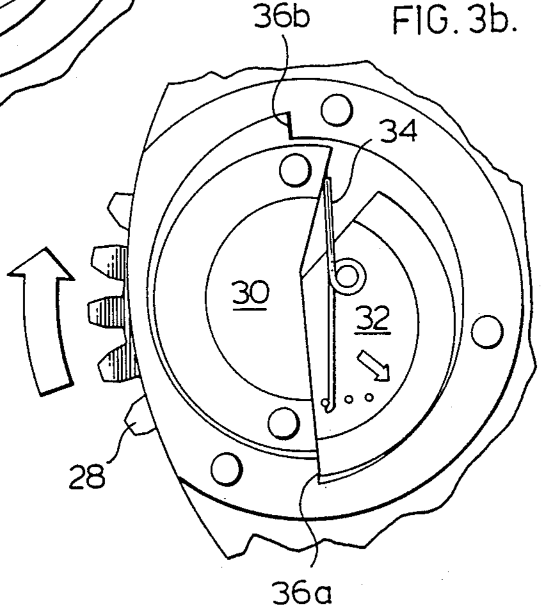
Figure 4:
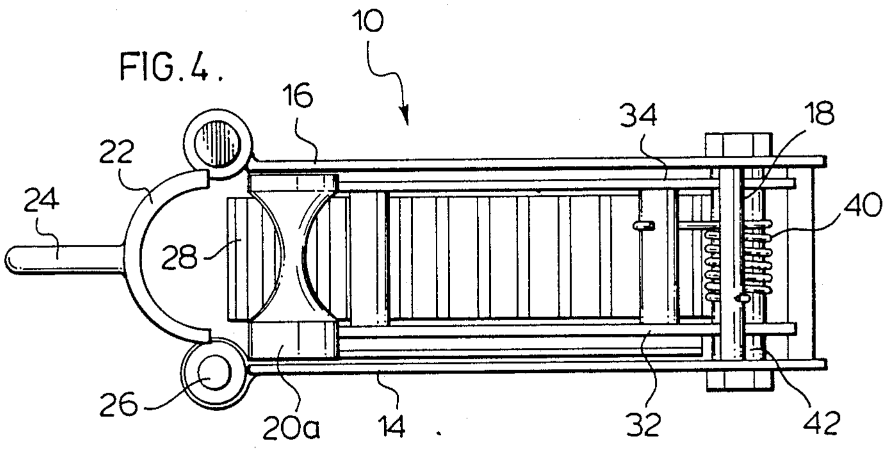
Figure 5A:
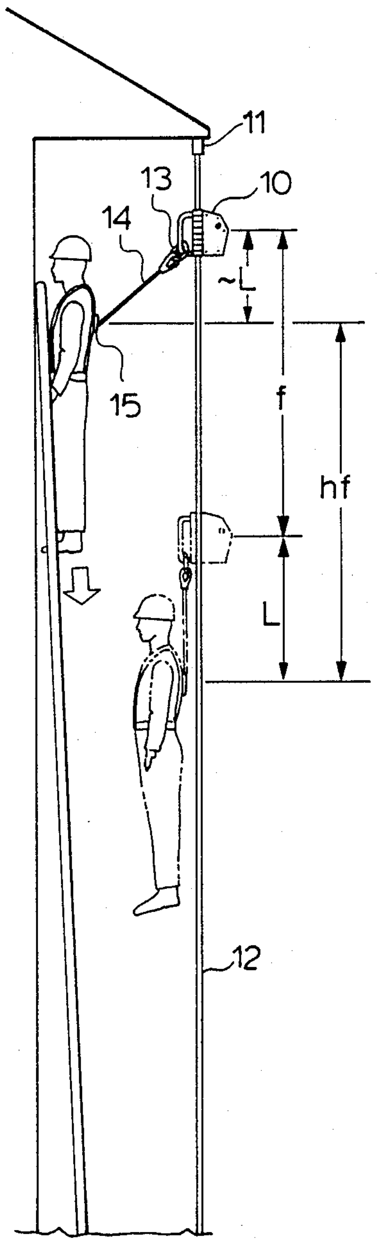
Figure 5B:
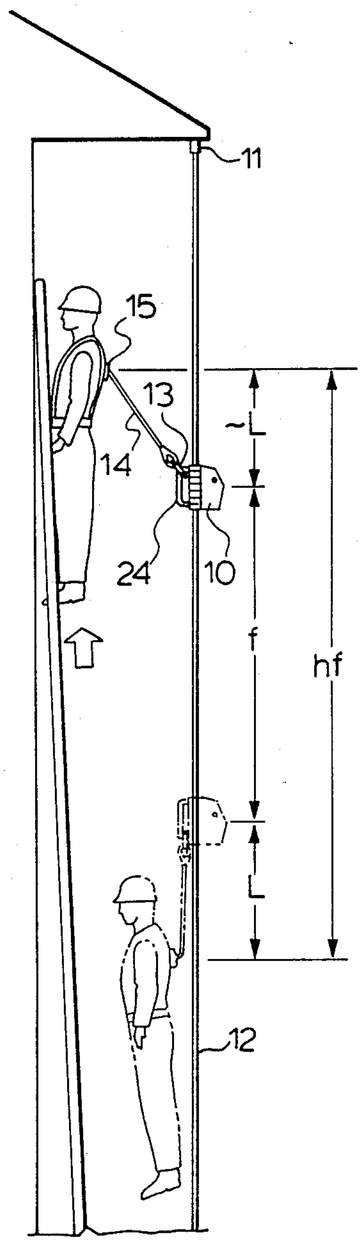

FIGS. 3*a* and 3*b* are side elevational views of the centrifugal locking mechanism of the fall arrest device in its low-velocity and high-velocity (locked) configurations, respectively;

FIG. 4 is a top plan view of the device as seen in the direction I—I of FIG. 2, with the lifeline omitted; and FIGS. 5*a* and 5*b* are schematic representations of the operation of a fall arrest system including a fall arrest device according to the invention.

The FAD of the invention, indicated in the drawings generally as 10, fits onto a vertical lifeline 12 which is anchored at the top end and has its free bottom end attached to a weight of sufficient mass to permit normal movement of the device along the lifeline as it is drawn upward by an ascending user, without lifting the rope itself and creating unwanted slack.

Figure 1:
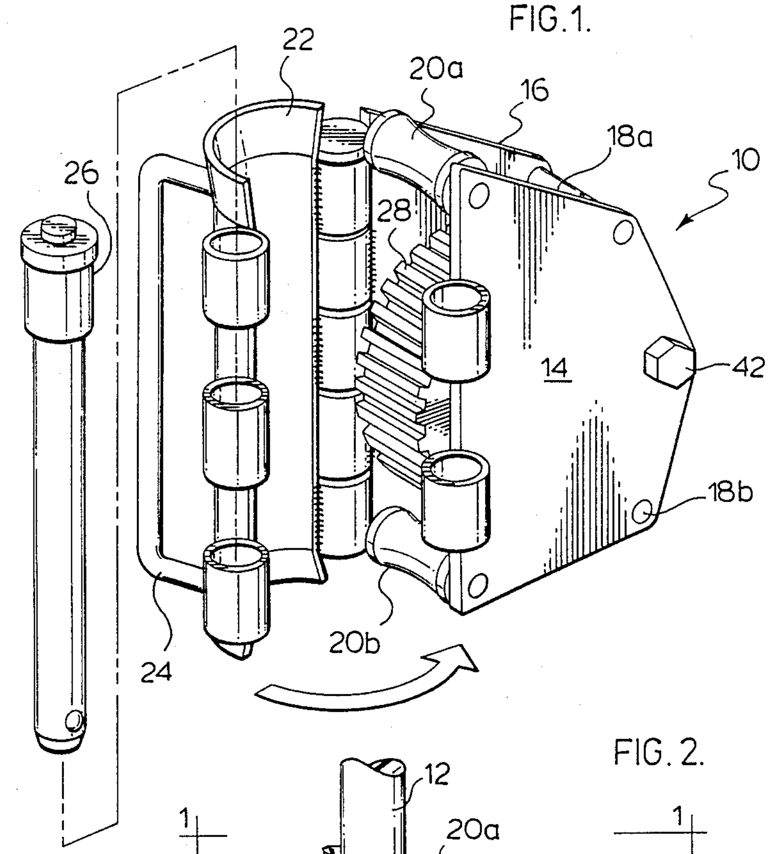
FIG. 1 is a perspective view of a fall arrest device according to the invention, with its lifeline receiving gate open.

As best seen in FIGS. 1, 2 and 4, the outer housing of the FAD is formed of cover plates 14 and 16 spaced apart by spacer pins 18*a* and 18*b* at the rear of the FAD and by contoured rope guides 20*a* and 20*b* at the front.

The outer housing is provided with a hinged gate 22 having an elongate handle 24 which can be opened to allow the lifeline 12 to be inserted into the FAD. Handle 24 also serves as the attachment point for a Karabiner link 13 between the FAD and a conventional lanyard/shock absorber connection to the safety harness worn by a user.

Gate or cover 22 is shown fully open in FIG. 1, with removable locking pin 26 to one side. When the gate 22 is closed (indicated by the directional arrow in FIG. 1) and locked onto lifeline 12, the lifeline is confined in the space between gate 22 and a toothed wheel 28, as best seen in FIG. 2.

Toothed wheel 28 is securely attached to a rotatable spindle 30, extending through the walls 32 and 34 of an inner wheel housing and journaled against bearing surfaces for rotation of the spindle. As the FAD is moved up or down the lifeline, friction between the toothed wheel 28 and the lifeline 12 causes the wheel to rotate. As described below, that frictional force is augmented by springloading urging the inner housing upwardly and thus the toothed wheel against the lifeline. Thus, in FIG. 2, clockwise arrow A corresponds to downward motion of FAD 10 along lifeline 12.

Co-rotating with the toothed wheel 28 in its inner housing and firmly attached to the spindle adjacent one side of the housing is a centrifugal clutch mechanism operable to brake the toothed wheel when its rotational velocity increases to a value corresponding to a predetermined downward velocity of the FAD—between 5 and 6 feet per second. Pawl means operable in response to the rotation of a wheel to lock the wheel against rotation are well known. A number of variations of the specific mechanism illustrated in the accompanying figures could serve as the velocity-dependent braking mechanism for the FAD of the invention.

In the embodiment illustrated, FIGS. 2 and 3*a* depict the components of the FAD in their relative disposition when the user is ascending the lifeline or descending at a sub-critical velocity. FIG. 3*b* depicts the locked configuration when the critical downward velocity is exceeded. An eccentric pawl disk 32 driven by toothed wheel 28 is caused to open against the resistance of pawl spring 34 when the speed of rotation increases from that encountered in ordinary descent (small clockwise arrow in FIG. 3*a*) to a value corresponding to the FAD moving at a rate of 5 to 6 feet per second in a downwards direction (large arrow in FIG. 3*b*). Such a velocity would be attained within 0.3 seconds of the user entering a free fall state. The extended pawl then catches against either of notches 36*a* and 36*b* formed in wall 32 of the inner housing, abruptly stopping the rotation of toothed wheel 28.

Stoppage of tooth wheel 28 triggers a self-actuating wedging action, by virtue of the fact that the inner wall housing is pivoted and spring-loaded within the outer housing of the FAD 10. As best seen in FIG. 2, tension spring 40 is wrapped around hinge pin 42, which passes through circular bearing surfaces in the walls of the inner housing. At its free ends, spring 40 engages cross-pin 44 of the inner housing and cross-pin 46 of the outer housing to urge the inner housing upward (i.e., clockwise) relative to the outer housing, as indicated by arrow C, so as to press toothed wheel 28 ever tighter against lifeline 12.

When the FAD descends fast enough to lock toothed wheel 28, the friction between the rope and the locked wheel causes the wheel, with its housing, to pivot in a clockwise sense about hinge pin 42 thereby assisting the action of the torsion spring 40. The inner housing is provided with an indentation or shoulder 35 adapted to abut and stop against rope guide 20*a* should the inner housing pivot beyond a predetermined angle. Stop 20*a* serves as a safeguard to prevent the inner housing pivoting so far as to release pressure on the lifeline.

This "wheel-on-a-lever" construction, with toothed wheel 28 mounted to a spring-biased inner housing pivotable with respect to the outer housing of the FAD, is self-actuating in that the friction between the lifeline and the stopped toothed wheel causes the toothed wheel to pivot about its contact with the lifeline so as to wedge the line against the gate of the outer housing, thereby causing the rope to jam and preventing further downward sliding of the FAD.

The operation of the FAD in use will now be described in connection with drawing FIGS. 5*a* and 5*b* illustrating a user whose fall takes place when he is descending or ascending, respectively.

Rope lifeline 12 is anchored at its highest point 11 and is attached at its lowest point (not shown) to a suspended tensioning weight, typically around 4–5 kg. sufficient to permit the user to ascend without lifting the rope itself. The handle 24 of FAD 10 is attached by means of Karabiner 13 to a conventional shock absorber (not shown) attached to a lanyard 14 which in turn is connected to the user's parachute-type fall harness 15.

In FIGS. 5*a* and 5*b*, the vertical distances marked L and f respectively represent the length of the lanyard/-shock absorber and the FAD sliding distance of lifeline 12 after occurrence of a fall. The critical parameter from the point of view of user safety is the "free fall distance" $h_f$ being the overall vertical drop of the user from the beginning of his fall until he is brought to rest.

The free fall distances given by the equation $h_f = f + KL$, where K is a "lanyard factor" which varies between about 0 and about 2. In the descending mode, shown in FIG. 5*a*, K will be slightly greater than 0, while in the ascending mode (FIG. 5*b*) where the user's lanyard is pulling the FAD up the lifeline, K will be slightly less than 2. Evidently, a value of 1 for K corresponds to horizontal extension of the lanyard, i.e., with the user at the same vertical height as the FAD.

TEST EXAMPLE

A 100 kg test mass was attached to a 1.2 m lanyard and thence to a Rose DynaBrake™ shock absorber, in turn connected to the FAD installed on a 16 mm nylon lifeline. The weight was dropped from various positions and $h_f$ was measured. Also measured was the maximum arrest force (MAF), by means of a calibrated load cell. It was found that the FAD successfully arrested the free fall of the weight in both the ascending and descending modes.

In each case f, the stopping distance of the FAD itself on the lifeline, was found to be 0.3 m or less and the measured MAF was 3.4 kN or less, with a duration of 50% of MAF of the order of 400 milliseconds. The Canadian Standards Association standard for its Security on a Lifeline Test requires that the peak braking force on the individual, not exceed 4 kN.

The FAD of the present invention thus reduces one of the principal risks of personal injury, the free fall distance and, in conjuction with a conventional fall arrest shock absorber, passes the requisite dynamic load tests while minimizing that free fall distance. In many applications, particularly power line maintenance, the structure being worked on will present a number of projections which could seriously injure a falling worker if he were not brought safely to a stop within a short distance. The FAD of the present invention, in use, has a sliding distance of $f \leqq 0.3$ m, because the centrifugal activating mechanism operates approximately 0.3 seconds from the commencement of the user's free fall and, as described above, the consequent self-actuating wedging action on the lifeline effectively prevents any significant amount of sliding.

Although one embodiment of the invention has been described in detail for illustrative purposes, it will be understood that it is not intended thereby to impose a limitation to the specific construction shown and described herein, as various modifications apparent to those skilled in the art may be made thereto. The invention sought to be protected is defined by the appended claims.

We claim:

1. A device which is movable along a vertical lifeline and operable to arrest the fall of a load connected thereto, comprising:

an outer housing having a first pair of spaced apart side plates presenting at the respective front edges thereof an opening into said outer housing;

a part-cylindrical cover operable to be removably secured adjacent corresponding front edges of said first pair of side plates, to form therewith a channel having top and bottom openings for passage therethrough of the lifeline;

an inner housing having a second pair of spaced apart side plates pivotally mounted at the rear thereof about a hinge pin secured at the rear of said outer housing;

a spindle journaled within and extending between said second pair of side plates and a surrounding toothed wheel securely attached to said spindle, presenting a regularly spaced plurality of transversely elongate teeth therealong;

spring means fixed to said outer housing to urge said inner housing pivotally about said hinge pin and upwardly relative to said outer housing, thereby causing said toothed wheel to bear against the lifeline in said channel with a predetermined normal force and increasing the friction between the toothed wheel and the lifeline, so that the toothed wheel rotates on the spindle in response to motion of the device up or down along the lifeline; and centrifugal clutch means operable to lock said toothed wheel against rotation relative to said inner housing when the rotational velocity of said spindle exceeds a critical value corresponding to a selected downward velocity of the device along the lifeline.

2. A device according to claim 1, wherein said spring means comprises a tension spring wound about said hinge pin and having its two free ends respectively secured to said inner housing and said outer housing.

3. A device according to claim 1, wherein said spring means exerts slightly more than sufficient frictional force to cause said device to be at rest against the force of its own weight when installed on a vertical lifeline.

4. A device according to claim 1, wherein said centrifugal clutch means comprises an eccentric pawl corotating with said spindle, a pawl spring operable to restrain said pawl from moving outwardly against centrifugal force until said critical value of rotational velocity is exceeded, and notch formations in a plate secured to the wall of said inner housing for engagement by said pawl.

5. A device according to claim 1, wherein said part-cylindrical cover is hingedly attached to one of said first pair of spaced-apart side plates and the other of said pair of spaced-apart side plates is provided with means cooperating with said cover to receive a removable locking pin.

6. A device according to claim 1, wherein said outer housing includes means for limiting the range of free pivoting motion of said inner housing within said outer housing.

7. A device according to claim 1, wherein said centrifugal clutch means is so designed as to lock said toothed wheel against rotation when the velocity of fall of said device is between 5 and 6 feet per second.

* * * * *